March 13, 1928. 1,662,452
F. M. BIRKS
DESUPERHEATER
Filed April 5, 1927
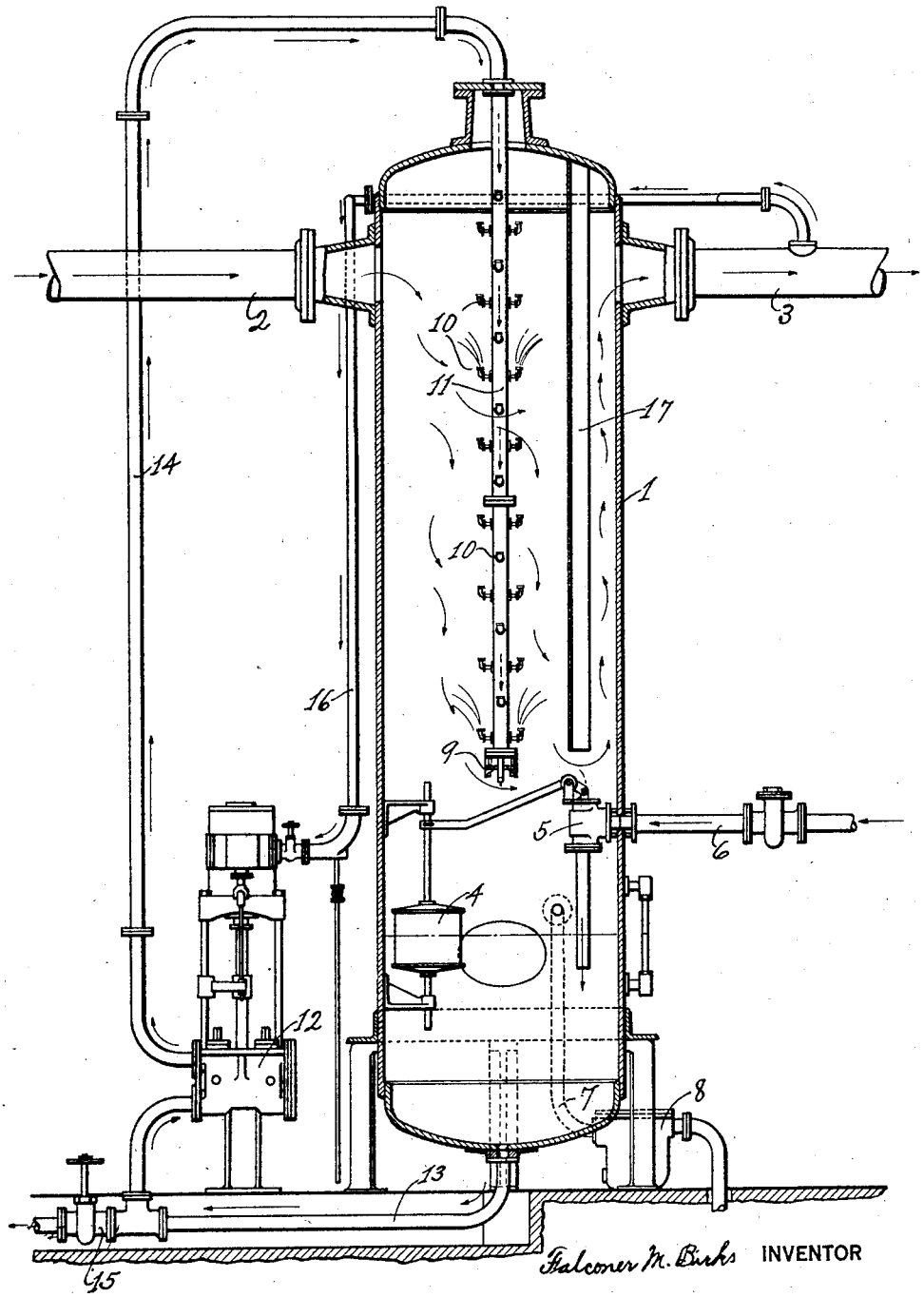
Falconer M. Birks INVENTOR
BY
Gifford & Scull ATTORNEYS Patented Mar. 13, 1928.

1,662,452

UNITED STATES PATENT OFFICE.

FALCONER M. BIRKS, OF LONDON, ENGLAND.

DESUPERHEATER.

Application filed April 5, 1927, Serial No. 181,120, and in Great Britain February 9, 1926.

This invention relates to improvements in and connected with de-superheaters. In the usual de-superheater the water spray is regulated by a thermostat, or the like, that depends upon the degree of superheat contained in the steam. Such thermostats are liable to derangement. Moreover, in such de-superheaters there is danger that too much water will be passed through the sprayers, which water will pass off through the trap and be lost, while in addition there is the possibility of the water passing over into the mains and to the engine, or the like, in which the steam is being used.

These disadvantages are avoided by the improved de-superheater forming the subject of the present invention, which is not dependent on thermostat control and will function efficiently no matter how large a quantity of water is passed through the sprayers.

The invention will be understood from the description in connection with the accompanying drawing, which is a vertical section through an illustrative embodiment of the invention. In the form shown, the improved de-superheater comprises an upright vessel or container 1 in the form of a drum that has a superheated steam inlet 2, and opposite it a saturated steam outlet 3 near the upper portion of the vessel. A body of water is contained in the vessel 1 and is maintained at a constant level by means of the float 4 that controls a valve 5 in the inlet pipe 6 for the water. The water may be introduced through the pipe 6 by means of a feed pump, or the like—not shown. The vessel 1 may be provided with an overflow pipe 7 that leads to a trap 8, so that the water level will be prevented from becoming too high in case the float 4 fails to close the valve 5 at the proper time.

Supported on a transverse plate 9 within the body of the vessel 1 and between the superheated steam inlet 2 and the saturated steam outlet 3, is a water spraying device consisting of a series of superposed nozzles 10 arranged on a vertical pipe 11 extending downwardly from the top of the vessel 1. This spraying device is supplied continuously from the body of water contained in the vessel 1 by means of a pump 12 drawing its supply from the vessel 1 through the suction pipe 13, and delivering it by way of the pipe 14 to the spraying device. The pipe 13 is provided with a branch pipe 15 with a valve therein, so that the device can be drained when desired.

The pump 12 is supplied with steam by a connection 16 leading from the saturated steam outlet 3. A division plate 17 extends across the vessel 1 to ensure that the whole of the high temperature steam which enters at the inlet 2 is passed down the vessel 1 and will be in contact with the water from the sprays 10, and to ensure that the water will be thoroughly mixed with the steam. The steam passes down the vessel 1 and up the space between the division plate 17 and the outlet nozzle to the saturated steam pipe 3.

When it is desired to remove all the superheat from the steam and obtain saturated steam, it is merely sufficient to circulate water by means of the pump 12 at a sufficiently rapid rate to pass enough water through the spraying device to exceed the minimum that is necessary to produce saturation of steam. This is because the water in the superheater is maintained at a constant level and being in contact with the steam is always at the saturation temperature of the steam. However, in case it is desired to remove less than the entire amount of superheat from the steam, a smaller quantity of water may be circulated by means of the pump 12 and sprayed through the spraying device, thus leaving a portion of the superheat in the steam as it is thereby partially de-superheated.

I claim:

1. A de-superheater comprising a container having a steam inlet and a steam outlet in the upper portion thereof, means for causing the steam to reverse in direction between the inlet and outlet, means for maintaining a body of water in the lower portion of said container, a water spraying device in said container between the steam inlet and steam outlet, and means for transferring the water in the vessel to the spraying device.

2. A de-superheater comprising a container having a steam inlet and a steam outlet in the upper portion thereof, means for maintaining a body of water in the lower portion of said container, a water spraying device in said container between the steam inlet and steam outlet, a plate extending from the top of the container between the spraying device and the steam outlet, to cause the steam to reverse direction of flow, and means for transferring the water in the vessel to the spraying device.

3. A de-superheater comprising a container having a steam inlet and a steam outlet in the upper portion thereof, means for maintaining a body of water in the lower portion of said container, a water spraying device in said container extending from the top downwardly between the steam inlet and steam outlet, said spraying device comprising a plurality of sprays and means for transferring the water in the vessel to the spraying device.

4. A de-superheater comprising a container having a steam inlet and a steam outlet in the upper portion thereof and means operated by steam from the steam outlet for removing water from the lower portion of said container and spraying it between said inlet and outlet.

5. A de-superheater comprising a container having a steam inlet and a steam outlet in the upper portion thereof and means operative regardless of the amount of superheat in the incoming steam for removing water from the lower portion of said container and spraying it between said inlet and outlet.

FALCONER M. BIRKS.